(No Model.)
R. S. WARING.
TRUCK FOR PAYING OFF ELECTRIC CABLES.
No. 284,100. Patented Aug. 28, 1883.
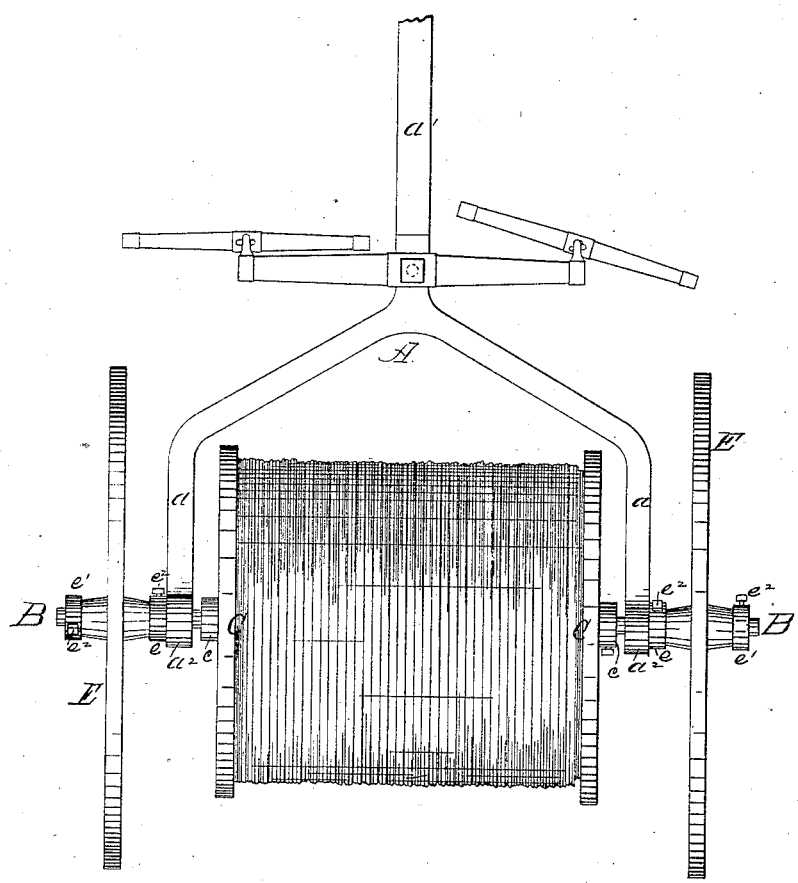

UNITED STATES PATENT OFFICE.

RICHARD S. WARING, OF PITTSBURG, PENNSYLVANIA, ASSIGNOR TO THE STANDARD CABLE COMPANY, OF SAME PLACE.

TRUCK FOR PAYING OFF ELECTRIC CABLE.

SPECIFICATION forming part of Letters Patent No. 284,100, dated August 28, 1883.

Application filed February 26, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Trucks for Paying Off Electric Cable; and I do hereby declare the following to be a full, clear, concise, and exact description thereof, reference being had to the accompanying drawing, making a part of this specification, which represents by a top plan view my improved apparatus.

My invention relates to a new and improved truck or apparatus for laying or paying off underground electric cables; and in general terms it consists of certain combinations of a draft-frame, a plain shaft or axle for carrying the cable-coil, wheels for supporting the shaft and reel, and binding-collars or equivalent devices for holding the wheels, frame, and reel in proper relationship, as hereinafter more fully described and claimed.

In preparing lead-covered electric cables for subsequent handling as they are delivered from the press it is customary to wind them in heavy coils upon reels or spools having a tubular axial passage somewhat like an ordinary thread-spool. The coils of cable thus made are too heavy to be handled by the appliances ordinarily employed for paying off wire for telegraphic purposes; and the purpose of my invention is to provide an apparatus adapted by its construction to meet the special requirements of this class of work.

In the drawing, A represents a draft-frame consisting of branching side arms, $a$, and pole $a'$, to which horses may be attached, or with which the apparatus may be moved by hand. In the outer ends of the arms $a$ are formed collars or eyes $a^2$, through which a plain round shaft, B, is loosely passed. The shaft is also passed through the axis of the cable-reel C, the arms $a$ being at either end of and separated a little distance from the heads of the reel by collars $c$, loose or made tight on the shaft by set-screws, as may be preferred. The purpose of these collars is to prevent the heads of the reel from engaging the side arms, $a$, when in motion. Owing to the great weight and momentum acquired by the reel in paying off cable, such engagement, if made, would do serious injury. Instead, however, of the collar $c$, the collars or eyes $a^2$ may be extended laterally toward the ends of the reel, and thereby secure the desired guard or protection. The shaft and reel are mounted and supported on two wheels, E, of greater radius than the reel, and having by preference broad tires adapted to carry a heavy weight on soft ground. These wheels are secured on the shaft by collars $e\ e'$, bound to the shaft in the desired position by set-screws $e^2$, whereby they may be removed and replaced easily and quickly. Instead of the collars $c\ e\ e'$, equivalent pins may be passed through holes in the shaft, and be secured therein by keys to prevent dropping out as the shaft may be turned. Such pin-holes will weaken the shaft, however, which is designed to carry a heavy load and to receive severe strain, and for these reasons I prefer to employ the collars to secure the parts in the desired relative positions on the shaft. In placing the wheels on the shaft its ends may be raised with jacks or levers to the desired height; or the reel may be deposited upon blocks or other raised bed of proper height to permit placing the wheels on the shaft, after which the blocks or bed may be removed. In removing the wheels to discharge an empty and receive a full reel, the shaft may be driven out endwise, the collars being first loosened.

This apparatus is simple and cheap in construction. It can be easily and quickly taken apart and put together for mounting and discharging a reel. It can be drawn safely and easily over rough and soft ground inaccessible to ordinary vehicles. It is strong and durable, requires but little special fitting, and is adapted to take the reels on which the cable is ordinarily stored, and pay it out as required for use or for laying in the trench without the labor and expense of re-coiling the cable from the storing to the truck reel. This feature of adaptation in taking the reels as first coiled for storing is of material importance, and greatly facilitates handling and laying the cable.

I claim herein as my invention—

1. In apparatus for paying off cable, a cable-reel having an axial opening or passage, in combination with a shaft of uniform size, adapted to be passed endwise through such axial opening, wheels adapted to fit on the shaft to support and carry the shaft and reel, and binding-collars or their described equivalent for holding the wheels and reel in position on the shaft, such holding devices being removable with reference to endwise insertion and withdrawal of the shaft into and from the reel, substantially as set forth.

2. A truck for paying off electric cable, having, in combination, a draft-frame, A, with side arms, a, a shaft, B, of uniform size, passed loosely through such arms, wheels E, and binding-collars or equivalent removable fastenings for holding the wheels and arms in proper relative positions on the shaft, substantially as set forth.

3. The combination of draft-frame A, having side arms, a, cable-reel C, shaft B, passed loosely through the arms and through the axis of the reel, wheels E, and removable collars or their described equivalent for spacing the wheels, arms, and reel on the shaft, with provision for endwise insertion and removal of the shaft into and from the reel, substantially as and for the purposes set forth.

In testimony whereof I have hereunto set my hand.

RICHARD S. WARING.

Witnesses:
C. L. PARKER,
R. H. WHITTLESEY.